United States Patent
Purbrick et al.

(10) Patent No.: US 6,838,505 B2
(45) Date of Patent: Jan. 4, 2005

(54) COATING FLUID FOR THE PREPARATION OF A RECORDING MEDIUM FOR USE IN INKJET PRINTING

(75) Inventors: Malcom D. Purbrick, Bushey (GB); Ian M. Newington, Hazlemere (GB); Julie Baker, Abbots Langley (GB)

(73) Assignee: Eastman Kodak Company, Rochester, NY (US)

( * ) Notice: Subject to any disclaimer, the term of this patent is extended or adjusted under 35 U.S.C. 154(b) by 173 days.

(21) Appl. No.: 09/981,221

(22) Filed: Oct. 16, 2001

(65) Prior Publication Data

US 2002/0081419 A1 Jun. 27, 2002

(30) Foreign Application Priority Data

Nov. 9, 2000 (GB) .............................................. 0027310

(51) Int. Cl.$^7$ .............................. C08K 3/22; C08K 3/36; C08L 29/04; C08L 83/00; B32B 27/20; B05D 3/00
(52) U.S. Cl. ........................ 524/430; 524/492; 524/557; 524/588; 427/444; 428/32.34
(58) Field of Search ................................ 524/430, 492, 524/557, 588; 427/511, 444; 428/195.1, 32.34

(56) References Cited

U.S. PATENT DOCUMENTS

| | | | |
|---|---|---|---|
| 4,517,244 A | | 5/1985 | Kobayashi et al. |
| 5,212,008 A | | 5/1993 | Malhorta et al. |
| 5,213,873 A | * | 5/1993 | Yasuda et al. ............ 428/32.18 |
| 5,562,975 A | * | 10/1996 | Sugai et al. ................. 428/212 |
| 6,187,430 B1 | * | 2/2001 | Mukoyoshi et al. ......... 428/331 |
| 6,485,812 B1 | * | 11/2002 | Sekiguchi ................ 428/32.29 |
| 6,511,736 B1 | * | 1/2003 | Asano et al. ................ 428/195 |

FOREIGN PATENT DOCUMENTS

| | | | |
|---|---|---|---|
| EP | 835752 A2 | * | 4/1998 |
| EP | 976572 A2 | * | 2/2000 |
| EP | 0 916 512 B1 | | 7/2001 |
| GB | 2316890 A | * | 3/1998 |

* cited by examiner

Primary Examiner—Callie Shosho
(74) Attorney, Agent, or Firm—Kathleen Neuner Manne

(57) ABSTRACT

A coating fluid for forming a coating on a support for use in inkjet printing comprises a liquid medium having dispersed therein (a) an inorganic oxide selected from aluminium oxide and silica, (b) a binder polymer, and (c) a polymeric crosslinking agent containing functional groups for reaction with the inorganic oxide. The components (a), (b) and (c) are preferably dispersed in an aqueous liquid and the relative amounts of inorganic oxide to polymeric crosslinking agent are from 500:1 to 15:1 preferably 250:1 to 20:1, the relative amounts of inorganic oxide to binder polymer are from 50:1 to 2:1 preferably 20:1 to 4:1 and the relative amounts of binder polymer to polymeric crosslinking agent are from 40:1 to 2:1 preferably from 20:1 to 3:1 the amounts being by weight on a dry basis.

13 Claims, No Drawings

COATING FLUID FOR THE PREPARATION OF A RECORDING MEDIUM FOR USE IN INKJET PRINTING

FIELD OF THE INVENTION

This invention relates to a coating fluid for the preparation of an ink absorbing recording medium for use in inkjet printing, to an ink absorbing material and to a process for the preparation of the ink absorbing material.

BACKGROUND OF THE INVENTION

In recent years reflecting the use of electronic still cameras and computers, the hard copy technology to record images on paper sheets has been rapidly developed. The goal is to bring the colour reproducibility, image density, gloss and weather resistance of the hard copy to the same level as silver halide photography. Ink jet systems have been used for hard copy recording since full colouring is easy and the printing noise is low. In an ink jet system ink droplets are ejected at high speed from nozzles to a recording material and the ink contains a large amount of solvent which is usually water.

The recording sheet for an inkjet printer is required to swiftly absorb the ink and have good colour forming properties. To reduce the dry time of the ink it has been previously proposed to provide a recording sheet having a porous layer formed on a substrate, the porous layer being formed of an inorganic oxides such as aluminium oxides or silica.

U.S. Pat. No 4,517,244 discloses an ink jet recording material having enhanced fixation rates comprising a support having therein a water insoluble resin having a water absorbing capacity of from 50 to 100 times its own weight.

U.S. Pat. No 5,212,008 discloses a recording sheet which comprises a substrate having two coatings. The first coating comprises (a) a crosslinking agent and (b) a polymer such as a polysaccharide cross linkable by (a). The second coating which is in contact with the first comprises a binder and compound such as an alkoxylated di-fatty quaternary compound.

European Patent Application No 916512 describes a coating fluid for application to a substrate for use in ink jet printing, the coating fluid comprising alumina hydrate particles dispersed in an aqueous medium which contains as binders a polyvinyl alcohol and a polymerisable compound having a hydrocarbon group with a hydroxyl group or a compound having a polyoxyalkylene chain, said compound having a substituent with an unsaturated bond or an epoxy group. The polymerisable compounds disclosed are monomers. The fluid is applied to a substrate such as polyethylene terephthalate, dried and heated with a polymerization initiator to effect polymerization of the polymerizable compound. Compared with the use of polyvinyl alcohol without the polymerizable binder, the advantage stated is that peeling of the coated layer is avoided and good image quality is maintained for a long period of time.

PROBLEM TO BE SOLVED BY THE INVENTION

There is a continuing need to improve the ability of the coating to absorb ink applied to it since this reduces the drying time.

The present invention provides a solution to this problem by including a cross linking agent capable of reacting with the aluminium oxide or other inorganic oxide in the coating fluid to form a more rigid structure and increase the rate of drying of ink applied to the coating.

SUMMARY OF THE INVENTION

According to the present invention there is provided a coating fluid for forming a coating on a support for use in inkjet printing said fluid comprising an liquid medium having dispersed therein (a) an inorganic oxide selected from aluminium oxide and silica, (b) a binder polymer, and (c) a polymeric cross linking agent containing functional groups for reaction with the inorganic oxide.

The components (a), (b) and (c) are preferably dispersed in an aqueous liquid.

According to another aspect of the present invention there is provided a process for the preparation of a coated support for use in inkjet printing which process comprises applying to the support a coating fluid as hereinbefore defined and causing the crosslinking agent to react with the inorganic oxide.

According to a further aspect of the present invention there is provided a support having a coating formed from a coating fluid as hereinbefore defined.

Advantageous Effect of the Invention

The advantage of the present invention is that the crosslinking of the inorganic oxide creates a more rigid structure and has the effect that ink applied to the coating dries more quickly. The cross linking agent is a preformed polymer and has a sufficient number of functional groups to increase the rigidity of the structure but not so many functional groups that it increases the rigidity too much which would make the coating brittle and risk cracking of the coating or so many functional groups that crosslinking occurs to an undesirably high degree such that the absorptive capacity of the layer is unduly reduced through excessive constraint upon its swelling. The result is that the coating retains sufficient flexibility to avoid cracking under conditions of normal use.

DETAILED DESCRIPTION OF THE INVENTION

The relative amounts of inorganic oxide to polymeric cross linking agent are conveniently from 500:1 to 15:1 preferably 250:1 to 20:1, the relative amounts of inorganic oxide to binder polymer are conveniently from 50:1 to 2:1 preferably 20:1 to 4:1 and the relative amounts of binder polymer to polymeric cross linking agent are conveniently from 40:1 to 2:1 preferably from 20:1 to 3:1 the amounts being by weight on a dry basis.

The binder polymer may be any of those known in the art. Such polymers include polyvinyl pyrrolidone, polyvinyl acetate, copolymers of styrene and acrylates, copolymers of styrene and butadiene, polyacrylates and polymethacrylates, copolymers of acrylic and methacrylic acid, polyacylamides and polymethacrylamides.

It is desirable that the binder polymer is soluble or dispersible in the medium which is usually water. Conveniently the polymer will form a colloidal dispersion in water.

The preferred binder polymer is polyvinyl alcohol, and it is preferred to use one having a molecular weight of from 1,000 to 100,000, preferably from 5,000 to 50,000. The degree of hydrolysis may be at least 80% preferably at least 90% or 95%.

It is desirable that the inorganic oxide is dispersible in the medium which is usually water.

Preferably the inorganic oxide is capable of forming a colloidal dispersion in water. When the inorganic oxide is aluminium oxide it usually comprises aluminium oxide hydrate particles. These are capable of being dispersed to form a colloidal dispersion in water.

The aluminium oxide is preferably fumed or colloidal since the particles are smaller (less than 100 nm) although other forms such as precipitated or gel may be used.

As the aluminium oxide hydrate one represented by the compositional formula $Al_2O_3.nH_2O$ where n is from 1 to 1.5 may be used. It is suitable as an ink receiving layer since the colourant is well absorbed and fixed to it. Aluminium oxide in the form of Bohemite or pseudo-Bohemite may be used. The latter is described in U.S. Pat. No 5,104,730.

The crosslinking agent is a molecule having at least two functional groups capable of reacting with —AlOH or —SiOH sites in the inorganic oxide. The functional groups are preferably silanol or silanol-forming groups such as SiOR where R is an alkyl group containing up to 6 carbon atoms or other monovalent hydrocarbon group containing from 1 to 6 carbon atoms. Alternatively the functional groups may be carboxylic acid, epoxy of epoxy-forming groups.

Desirably the molecular weight of the cross linking agent is such that it is soluble or dispersible to form a colloidal dispersion in water. The molecular weight is not critical but will typically be in the range from about 1000 to about 30,000 for example from about 1500 to about 10,000.

The polymeric crosslinking agent may have the structure:

polymer --- A --- $Si(OR)_3$ where

A is optional and when present is a linking group containing not more than 12 carbon atoms, R is hydrogen or a monovalent hydrocarbon group containing from 1 to 6 carbon atoms and the polymer is selected so that the crosslinking agent is dispersible in water A preferred group of crosslinking agents are those containing water dispersible protein moiety linked through a short chain of carbon atoms typically 2 to 12 carbon atoms to a silicon atom containing the functional groups for the cross linking.

A typical member of the group is Crodasone C obtained commercially from Croda Chemicals limited which has the structure:

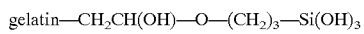

where the gelatin has a molecular weigh in the range from about 2,000 to 5,000. The gelatin has been partially hydrolysed to render it water dispersible and reduce its viscosity.

This molecule crosslinks through the silanol groups slowly on drying at 20 degrees Centigrade and fast at 60 degrees Centigrade.

Although it is beneficial to make the coating more rigid it is desirable the coating retain a degree of flexibility.

It is preferable therefore that the crosslinking agent has not more than one functional group per 400 units of molecular weight, more preferably 1000 units of molecular weight.

As the means to coat the coating fluid of the present invention onto the substrate e.g. a dye coater, a roll coater, an airknife coater, a blade coater, a rod coater or a comma coater may be employed.

The crosslinking of the binder polymer by the cross linking agent may be effected at room temperature e.g. 20 degrees Centigrade, or may be promoted by heating, ultraviolet rays or an electron beam after coating.

The coating when dry forms a porous layer which may have pores having pore radii which are from 1 to 15 nm, and the pore volume may be from 0.4 to 2.0 cc/g. The porous layer will then have an adequate absorptivity, and transparency.

The pore radii may be from 3 to 10 nm. The pore radii distribution may be measured by a nitrogen adsorption/desorption method.

The thickness of the porous layer on the recording sheet is suitably selected depending upon eg the specification of the printer. The thickness may be above or below 100 micrometers. It is frequently in the range from about 30 to about 50 micrometers at a void fraction of 0.5. (ie volume of pores is 50% of the layer)

The invention is illustrated by the following Examples.

Functional Polymers to Serve as cross linking agents for Ink Jet Media

EXAMPLE 1

A coating fluid was prepared by mixing together at room temperature an aqueous aluminium oxide slurry containing about 40% by weight of solids, a dispersion of polyvinyl alcohol (98% hydrolysis, molecular weight 13,000 to 23,000) in water containing about 10% by weight of solids and a dispersion of the polymeric crosslinking agent containing about 2.5% by weight of solids. The amounts of the three dispersions were adjusted to yield a coating containing the three components in the weight ratio of about 90:9:1 aluminium oxide: polyvinyl alcohol: polymeric cross linking agent on a dry basis. After mixing the dispersions together the mixture was used immediately to coat an ESTAR™ support to form an ink absorbing layer Using a rod coater the ink absorbing layer was coated at a lay down of between 24 $g/m^2$ and 28 $g/m^2$ of aluminium oxide slurry, between 2.5 and 3.5 $g/m^2$ polyvinyl alcohol and a cross linking agent at a laydown of approx. 0.25 $g/m^2$. The aluminium oxide, PVA and cross linking agent were therefore coated at a ratio of approximately 90:9:1 by weight. on a dry basis.

The coating was allowed to dry at 20 degrees centigrade. The crosslinking reactions were allowed to take place during the drying. No heating or other means to assist the cross linking was necessary.

The function of the crossslinking agent in the ink absorbing layer is to crosslink with the inorganic oxide, which creates a more rigid structure. This forces the aluminium oxide particles to be more separated, which in turn imparts more free volume. This can be evaluated by the measuring the density of ink transferred to a piece of plain paper, which had been sandwiched to the printed image immediately after the sample exited the ink jet printer. The lower the density of ink on the plain paper, the faster the sample dried. An alternative method is to visually assess the piece of plain paper that had been sandwiched to the printed image and identify the point at which the ink transfer disappears. Knowing the time taken for the image to print, this can then be used to calculate the average time taken for the sample to dry.

The results in table 1 show the density of ink transferred to the piece of plain paper 60 seconds after the sample has exited the printer. Average time taken for the samples to dry is also shown compared to the control coating where no crosslinking agent was added.

TABLE 1

| AOS (g/m$^2$) | PVA (g/m$^2$) | Glue 1 (g/m$^2$) | Glue 2 (g/m$^2$) | Epson Stylus Photo 700 | | Canon BJC4400 | |
|---|---|---|---|---|---|---|---|
| | | | | Ink Density @ 60 s | Avg Dry Time (Mins) | Ink Density @ 60 s | Avg Dry Time (Mins) |
| 24.42 | 2.71 | 0.244 | — | 0.001 | 0.42 | 0.760 | 2.17 |
| 24.97 | 2.77 | — | 0.250 | 0.062 | 0.85 | 0.080 | 0.50 |
| 27.20 | 3.06 | — | — | 1.211 | >4.27 | 0.859 | 3.33 |
| Time Taken To Print Image (Mins) | | | | | 4.27 | | 5.95 |

Key:

AOS=Aluminium Oxide Slurry crosslinking agent 1=Crodasone* Sesame (sesame amino acid polysiloxane copolymer) referred to as glue 1 in the above table crosslinking agent 2=Crodasone* W (aqua and hydrolysed wheat protein hydroxpropyl polysiloxane) referred to as glue 2 in the above table.

*obtained commercially from Croda Colloids Limited of the U.K.

60 degrees Centigrade.

The results show quite clearly for the two ink sets tested, that both the average time taken to dry the sample and the density of ink transferred 60 seconds after the sample was ejected form the printer are improved when the crosslinking agent is present in the formulation.

Printer set-ups:

Epson Stylus Photo 700 printer was used with the following settings:

Print quality—superfine 1440 dpi

Photo quality ink jet paper

Canon BJC4400 printer was used with the following settings:

High print quality photo colour automatic print model

Glossy photo paper

What is claimed is:

1. A coating fluid for forming a coating on a support for use in inkjet printing, said fluid comprising a liquid medium having dispersed therein (a) an inorganic oxide selected from the group consisting of aluminium oxide and silica, (b) a binder polymer, and (c) a polymeric crosslinking agent containing functional groups for reaction with the inorganic oxide, wherein the relative amount of inorganic oxide to polymeric crosslinking agent is from 500:1 to 15:1 and the relative amount of inorganic oxide to binder polymer is from 50:1 to 2:1, the amount being by weight on a dry basis, wherein the functional groups in the cross linking agent react with hydroxyl groups on the inorganic oxide to form in the case of alumina Si—O—Al bonds or in the case of silica Si—O—Si bonds.

2. A coating fluid as claimed in claim 1 wherein the components (a), (b) and (c) are dispersed in an aqueous liquid.

3. A coating fluid as claimed in claim 1 wherein the binder polymer is polyvinyl alcohol.

4. A coating fluid as claimed in claim 1 wherein the relative amount of binder polymer to polymeric crosslinking agent is from 40:1 to 2:1, the amounts being by weight on a dry basis.

5. A coating fluid as claimed in claim 1 wherein the polymeric crosslinking agent has the structure:

polymer --- A --- Si(OR)$_3$ where

A is optional and when present is a linking group containing not more than 12 carbon atoms, R is hydrogen or a monovalent hydrocarbon group containing from 1 to 6 carbon atoms and the polymer is selected so that the crosslinking agent is dispersible in water.

6. A coating fluid as claimed in claim 1 wherein the polymeric crosslinking agent has been obtained by the partial hydrolysis of a protein to render it water dispersible and where the protein has a silane containing functional groups for the cross linking of the inorganic oxide.

7. A process for the preparation of a coated support for use as an ink absorbing substrate in inkjet printing which process comprises applying to the support a coating fluid as claimed in claim 1 and causing the crosslinking agent to react with the inorganic oxide.

8. A coated support for use in ink jet printing said support having a coating formed by the application to the support of a coating fluid as claimed in claim 1.

9. A coating fluid as claimed in claim 1 wherein the relative amount of inorganic oxide to binder polymer is from 20:1 to 4:1, the amount being by weight on a dry basis.

10. A coating fluid as claimed in claim 1 wherein the relative amount of binder polymer to polymeric crosslinking agent is from 20:1 to 3:1, the amount being by weight on a dry basis.

11. A coating fluid as claimed in claim 1, wherein the crosslinking agent has not more than one functional group for reaction with the inorganic oxide per 400 units of molecular weight.

12. A coating fluid for forming a coating on a support for use in inkjet printing, said fluid comprising a liquid medium having dispersed therein (a) an inorganic oxide selected from the group consisting of aluminium oxide and silica, (b) a binder polymer, and (c) a polymeric crosslinking agent containing functional groups for reaction with the inorganic oxide, wherein the relative amount of inorganic oxide to binder polymer is from 50:1 to 2:1, the amount being by weight on a dry basis and wherein the relative amount of inorganic oxide to polymeric crosslinking agent is from 250:1 to 20:1, the amount being by weight on a dry basis and wherein the functional groups in the crosslinking agent react with hydroxyl groups on the inorganic oxide to form in the case of alumina Si—O—Al bonds or in the case of silica Si—O—Si bonds.

13. A coating fluid for forming a coating on a support for use in inkjet printing, said fluid comprising a liquid medium having dispersed therein (a) an inorganic oxide selected from the group consisting of aluminium oxide and silica, (b) a binder polymer, and (c) a polymeric crosslinking agent containing functional groups for reaction with the inorganic oxide wherein the relative amount of inorganic oxide to polymeric crosslinking agent is from 250:1 to 20:1, the relative amount of inorganic oxide to binder polymer is from 20:1 to 4:1 and the relative amount of binder polymer to polymeric crosslinking agent is from 20:1 to 3:1, the amounts being by weight on a dry basis and wherein the functional groups in the crosslinking agent react with hydroxyl groups on the inorganic oxide to form in the case of alumina Si—O—Al bonds or in the case of silica Si—O—Si bonds.

* * * * *